(12) United States Patent
Klitzsch et al.

(10) Patent No.: US 10,759,703 B2
(45) Date of Patent: Sep. 1, 2020

(54) METHOD FOR TREATING REFRACTORY CERAMIC PRODUCTS, USE OF THE TREATED PRODUCTS, AND A REFRACTORY CERAMIC PRODUCT

(71) Applicant: Refractory Intellectual Property GmbH & Co. KG, Vienna (AT)

(72) Inventors: Michael Klitzsch, Leoben (AT); Martin Geith, Leoben (AT); Karl Budna, Graz (AT); Josef Nievoll, Vienna (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 295 days.

(21) Appl. No.: 15/789,236

(22) Filed: Oct. 20, 2017

(65) Prior Publication Data
US 2018/0134622 A1 May 17, 2018

(30) Foreign Application Priority Data

Nov. 17, 2016 (EP) .................................. 16199239

(51) Int. Cl.
| | |
|---|---|
| *C04B 35/03* | (2006.01) |
| *C04B 35/48* | (2006.01) |
| *C04B 35/64* | (2006.01) |
| *C04B 35/105* | (2006.01) |
| *C04B 35/626* | (2006.01) |
| *C04B 35/04* | (2006.01) |
| *C04B 35/443* | (2006.01) |
| *C04B 35/622* | (2006.01) |

(52) U.S. Cl.
CPC .............. *C04B 35/03* (2013.01); *C04B 35/04* (2013.01); *C04B 35/105* (2013.01); *C04B 35/443* (2013.01); *C04B 35/48* (2013.01); *C04B 35/6261* (2013.01); *C04B 35/62204* (2013.01); *C04B 35/62625* (2013.01); *C04B 35/62655* (2013.01); *C04B 35/64* (2013.01); C04B 2235/3201 (2013.01); C04B 2235/3205 (2013.01); C04B 2235/3208 (2013.01); C04B 2235/3217 (2013.01); C04B 2235/3244 (2013.01); C04B 2235/3262 (2013.01); C04B 2235/3272 (2013.01); *C04B 2235/3418* (2013.01); *C04B 2235/5427* (2013.01); *C04B 2235/66* (2013.01); *C04B 2235/77* (2013.01); *C04B 2235/96* (2013.01)

(58) Field of Classification Search
CPC .... C04B 2235/3201; C04B 2235/3205; C04B 2235/3208; C04B 2235/3217; C04B 2235/3244; C04B 2235/3262; C04B 2235/3272; C04B 2235/3418; C04B 2235/5427; C04B 2235/66; C04B 2235/77; C04B 2235/96; C04B 35/03; C04B 35/04; C04B 35/105; C04B 35/443; C04B 35/48; C04B 35/62204; C04B 35/6261; C04B 35/62625; C04B 35/62655; C04B 35/64
See application file for complete search history.

(56) References Cited

U.S. PATENT DOCUMENTS

| | | | | |
|---|---|---|---|---|
| 3,275,461 | A * | 9/1966 | Davies ..................... | C04B 35/03 501/109 |
| 3,302,997 | A * | 2/1967 | Heuer ..................... | C04B 2/102 423/166 |
| 4,140,745 | A * | 2/1979 | Hassler ..................... | C01F 5/06 423/165 |
| 5,565,390 | A * | 10/1996 | Nievoll ................. | C04B 35/043 501/120 |
| 2009/0286668 | A1* | 11/2009 | Nakamura ............ | C04B 35/013 501/120 |

FOREIGN PATENT DOCUMENTS

GB 861931 A * 3/1961 ................ C01F 5/02

* cited by examiner

*Primary Examiner* — Jenny R Wu

(74) *Attorney, Agent, or Firm* — Medley, Behrens & Lewis, LLC

(57) ABSTRACT

A method for treating refractory ceramic products is described herein. The method includes providing a refractory ceramic product, comprising magnesia and at least one of the following salts: one or more alkali salts and one or more alkaline earth salts. The method also includes providing a water-based liquid, combining the refractory ceramic product with the liquid, and separating the refractory ceramic product and the liquid.

10 Claims, No Drawings

METHOD FOR TREATING REFRACTORY CERAMIC PRODUCTS, USE OF THE TREATED PRODUCTS, AND A REFRACTORY CERAMIC PRODUCT

The invention relates to a method for treating refractory ceramic products, a use of the refractory ceramic products treated in accordance with the method, and a refractory ceramic product.

The term "refractory ceramic product" within the scope of the invention denotes in particular refractory ceramic products with an application temperature of more than 600° C. and preferably refractory materials according to DIN 51060: 2000-6, that is to say materials with a pyrometric cone equivalent greater than SK 17. The pyrometric cone equivalent can be determined in particular in accordance with DIN EN 993-12:1997-06.

Refractory ceramic products are used for example also for the lining of rotary kilns for burning cement clinker ("cement rotary kilns"). During the burning process in cement rotary kilns of this kind, gaseous substances form, in particular for example also gaseous substances in the form of alkali or alkaline earth salts, which penetrate into the pore space of the refractory lining of the rotary kiln. The gaseous substances condense in part in the pore space, and therefore the pore space of the refractory lining is gradually coated or contaminated by the condensate of these gaseous substances, i.e. in particular alkali and alkaline earth salts.

After a specific operating period of the cement rotary kiln, the refractory lining thereof is worn to such an extent that it has to be removed from the cement rotary kiln and replaced by a new lining made of refractory ceramic products. Refractory ceramic products which are usually used to line the burning zones of cement rotary kilns are generally refractory ceramic products based on magnesia (MgO), i.e. high-quality refractory ceramic products. In order to obtain the magnesia required for the production of refractory ceramic products of this kind, raw materials based on magnesite, that is to say magnesium carbonate ($MgCO_3$), are usually used. Such magnesite-based raw materials are calcined in order to produce magnesia, that is to say are exposed to a temperature such that the magnesite breaks down into magnesia and carbon dioxide ($CO_2$), wherein the magnesia is then further processed into a magnesia-based refractory ceramic product and the carbon dioxide is released as waste gas into the atmosphere. In order to produce a magnesia-based raw material, from which magnesia-based refractory ceramic products can be produced, energy must therefore be applied for the calcination of the magnesite, on the one hand. On the other hand, this calcination process stresses the environment as a result of the release of carbon dioxide into the atmosphere. Against this background, it is therefore desirable to be able to recycle magnesia-based refractory ceramic products removed from a cement rotary kiln or to reuse them for the production of new magnesia-based refractory ceramic products.

This is problematic, however, due to the above-mentioned contamination of this removed material with alkali and alkaline earth salts, since these salts can impair the properties of a new refractory ceramic product that has been produced with use of removed material of this kind.

Thus, many efforts have been made to treat magnesia-based refractory ceramic products loaded by alkali and alkaline earth salts, so that the subsequently obtained product can be reused as raw material for the production of new magnesia-based refractory ceramic products.

By way of example, it has been attempted to treat removed material of this type by exposing it to such a temperature that the alkali and alkaline earth salts present in the pore space evaporate. However, the alkali and alkaline earth salts emitted in this case in gaseous form have proven to be so corrosive that the waste gas lines of corresponding treatment facilities would have to be provided with very costly filter systems for waste gas purification in order to be able to observe the emission limits.

In accordance with an alternative treatment method, it has been attempted to recycle removed magnesia-based lining material from cement rotary kilns by melting said material in an electric kiln. However, in this case as well, costly filter systems are necessary in the waste gas lines for waste gas purification. A melting process of this type in an electric kiln is also associated with a very high energy consumption in view of the melting point of magnesia (approximately 2800° C.)

One object of the invention is to provide a magnesia-based method for treating a refractory ceramic product which contains contaminations with alkali and alkaline earth salts, by means of which method the proportion of such alkali and alkaline earth salts in the product can be reduced. A further object of the invention is to provide a method which, when carried out, does not result in the creation of gaseous alkali and alkaline earth salts. A further object of the invention lies in providing a method of which the execution is associated with a very low energy consumption. A further object of the invention lies in providing a method that can be executed particularly economically.

In order to achieve these objects, a method for treating refractory ceramic products is provided in accordance with the invention, said method having the following features:
  providing a refractory ceramic product comprising:
    magnesia and
    at least one of the following salts: one or more alkali salts and one or more alkaline earth salts;
  providing a water-based liquid;
  combining the refractory ceramic product with the liquid;
  separating the refractory ceramic product and the liquid.

The invention is based on the surprising finding that the proportion of contaminations in the form of alkali and alkaline earth salts in magnesia-based refractory ceramic products can be reduced effectively and with an extremely low expenditure of energy and cost by combining such magnesia-based refractory ceramic products with a water-based liquid and then separating said products again from this liquid.

This is because it has been found, in accordance with the invention, that alkali and alkaline earth salts of this kind, when the magnesia-based refractory ceramic products contaminated by said salts are contacted with a water-based liquid, dissolve quickly and comprehensively in the liquid, so that the proportion of these alkali and alkaline earth salts in the product is reduced when said product is contacted with water. This can be monitored by way of example by measuring the electrical conductivity of the water.

It has also surprisingly been found in conjunction with the method according to the invention that the magnesia contents of the refractory ceramic product are hydrated, i.e. react to form magnesium hydroxide ($Mg(OH)_2$), only to a very small extent when the product is combined with the liquid. This would not have been expected, based on the known, high hydration tendency of magnesia.

The refractory ceramic product provided for execution of the method according to the invention can be present in particular in the form of a used refractory lining of a rotary kiln for burning cement clinker ("cement rotary kiln"). The method according to the invention, in this respect, can be preceded by the following method step:

removing the refractory ceramic lining of a rotary kiln for burning cement clinker, said lining comprising magnesia and at least one of the following salts: one or more alkali salts and one or more alkaline earth salts.

This removed lining can then be provided as refractory ceramic product for the method according to the invention.

The refractory ceramic product is preferably provided in the form of bulk material, that is to say in granular form.

In accordance with the invention, it has been found that the magnesia content of the magnesia-based refractory ceramic product forming the basis of the method according to the invention has an increased tendency for hydration if the refractory ceramic product is present with a mean grain size less than 0.1 mm. In this respect, it can be provided that the refractory ceramic product, in particular if this is present in the form of bulk material, is present to an extent of at least 90 mass %, i.e. for example also to an extent of at least 95 mass % or to an extent of 100 mass %, with a grain size of more than 0.1 mm, that is to say is also present in the above-mentioned amounts by way of example with a grain size of more than 0.5 or 1.0 mm.

It has also been found in accordance with the invention that alkali and alkaline earth salts from the refractory ceramic product dissolve to a reduced extent in the water-based liquid if the refractory ceramic product is present with a mean grain size of more than 50 mm. In this regard, it can be provided that the refractory ceramic product, in particular if this is present in the form of bulk material, is present to an extent of at least 90 mass %, i.e. for example also to an extent of at least 95 mass % or to an extent of 100 mass %, with a grain size less than 50 mm, that is to say is also present in the above-mentioned proportions by way of example with a grain size of less than 40 mm, 30 mm, 20 mm, or 10 mm.

The refractory ceramic product is particularly preferably present to an extent of 100% with a grain size between 0.5 and 10 mm.

The statements provided herein with regard to the grain size are determined in accordance with DIN EN 933-1:2012-03 and in accordance with DIN EN 933-2:1996-01.

Insofar as a refractory ceramic product in the form of a refractory ceramic lining removed from a cement rotary kiln forms the basis of the method according to the invention, it can be provided that this lining is comminuted after having been removed and before being combined with the water-based liquid. In this regard, the method step according to the invention of removing the refractory lining of a cement rotary kiln can be followed by the following method step:

comminuting the removed refractory ceramic lining.

Due to the comminution of the removed lining, this can be comminuted to the desired maximum grain size, or the desired grain range of the refractory ceramic product provided for the method according to the invention can be set. In this regard, the grain size can be comminuted, or the grain range can be set to the above-described grain size.

The refractory ceramic product provided for the method according to the invention can be, in principle, any magnesia-based refractory ceramic product. The refractory ceramic product preferably comprises a content of magnesia of at least 60 mass %, in relation to the total mass of the refractory ceramic product. In this regard, the refractory ceramic product by way of example can also comprise magnesia in a proportion of at least 70, 80, 85, 90, 95, 98 or 99 mass %, in each case in relation to the total mass of the refractory ceramic product.

Besides magnesia and one or more alkaline and/or alkaline earth salts, the refractory ceramic product can also comprise in particular one or more of the following oxides: $Al_2O_3$, $Fe_2O_3$, $ZrO_2$, $SiO_2$ or $MnO$.

In accordance with one embodiment, it is provided that the refractory ceramic product, to an extent of at least 80 mass %, i.e. for example also to an extent of at least 85, 90, 95, 98 or 99 mass %, comprises one or more of the following substances: MgO, alkali salts, alkaline earth salts, $Al_2O_3$, $Fe_2O_3$, $ZrO_2$, $SiO_2$ or $MnO$.

Here, the further oxides $Al_2O_3$, $Fe_2O_3$, $ZrO_2$, $SiO_2$ and $MnO$ can be present in the refractory ceramic product for example within the following mass proportions, in each case in relation to the total mass of the refractory ceramic product, wherein these oxides can each be present, individually or in combination, in the following mass proportions:

$Al_2O_3$: 0 to 30 mass %, i.e. for example also at least 1, 2, 3, 4 or 5 mass %, and for example also at most 29, 28, 27, 26, 25, 24, 23, 22 or 20 mass %;

$Fe_2O_3$: 0 to 15 mass %, i.e. for example also at least 1, 2 or 3 mass %, and for example also at most 10, 9, 8, 7, 6 or 5 mass %;

$ZrO_2$: 0 to 5 mass %;

$SiO_2$: 0 to 2.5 mass %;

$MnO$: 0 to 6 mass %;

$CaO$: 0 to 3 mass %.

It is also preferably provided that the refractory ceramic product comprises no chromium oxide ($Cr_2O_3$) or only a small amount thereof, preferably amounts of chromium oxide of less than 1 mass %, in relation to the total mass of refractory ceramic product, i.e. for example also amounts of chromium oxide of less than 0.5 mass %.

From a mineralogical viewpoint, the structure of the refractory ceramic product can consist largely of periclase (MgO). In addition, MgO and further oxides can be present in the refractory ceramic product, for example also in the form of one or more of the following crystallographic structures: spinel ($MgO \cdot Al_2O_3$), pleonaste (iron-containing spinel, i.e. $MgO \cdot Al_2O_3$ with incorporation of $Fe^{2+}$ or $Fe^{3+}$ ions), hercynite ($FeO \cdot Al_2O_3$), or galaxite ($MnO \cdot Al_2O_3$).

The refractory ceramic product provided for the execution of the method according to the invention comprises at least one of the following salts: one or more alkali salts and one or more alkaline earth salts. The refractory ceramic product provided for the execution of the method according to the invention can have a content of alkali and alkaline earth salts of at least 1 mass %, in relation to the total mass of the refractory ceramic product.

Herein, alkali and alkaline earth salts are understood to mean all salts of the alkali or alkaline earth metals, i.e. in particular salts of one or more of the following alkali and alkaline earth metals: lithium, sodium, potassium, magnesium and calcium. Insofar as these alkali and alkaline earth metals are present in the form of salts in accordance with the invention, they can be present in particular in the form of chloride (that is to say with a chloride anion $Cl^-$) and/or in the form of sulphate (that is to say with a sulphate anion $SO_4^{2-}$). In this regard, the alkali and alkaline earth salts can be present in the refractory ceramic product in accordance with the invention by way of example in the form of one or more of the following salts: lithium sulphate ($Li_2SO_4$), lithium chloride (LiCl), sodium sulphate ($Na_2SO_4$), sodium chloride (NaCl), potassium sulphate ($K_2SO_4$), potassium chloride (KCl), magnesium sulphate ($MgSO_4$), magnesium chloride ($MgCl_2$), calcium sulphate ($CaSO_4$), and calcium chloride ($CaCl_2$). In particular, the alkali and alkaline earth salts can be present in accordance with the invention in the form of one or more of the following salts: lithium sulphate, lithium chloride, sodium sulphate, NaCl, potassium sulphate or potassium chloride and mixed crystals, for example potassium calcium sulphate. The alkali and alkaline earth salts particularly preferably can be present in accordance with the invention in the form of one or more of the following salts: sodium sulphate, sodium chloride, potassium sulphate or potassium chloride.

Because the alkali and alkaline earth salts of the refractory ceramic product dissolve in the water-based liquid, the proportion of these salts in the refractory ceramic product is significantly reduced by the method according to the invention. In this regard, it has been found in accordance with the invention that, by means of the treatment of a magnesia-based refractory ceramic product contaminated with alkali and alkaline earth salts, the proportion of alkali and alkaline earth salts in the product can be reduced to an extent of more than 50 mass %, that is to say for example also to an extent of more than 60, 70, 80, 90 or even more than 90 mass %, in relation to the total mass of the alkali and alkaline earth salts in the refractory ceramic product prior to the treatment thereof in accordance with the method according to the invention.

In some cases, the alkali and alkaline earth salts in the refractory ceramic products contaminated by these salts fill practically the entire pore space of this product. In this regard the proportion of the alkali and alkaline earth salts in the refractory ceramic product prior to the execution of the method according to the invention can be relatively high. In one embodiment, it is provided that the proportion of the alkali and alkaline earth salts in the refractory ceramic product is up to 12 mass %, that is to say for example also up to 11, 10, 9, 8, 7, 6 or 5 mass %, in each case in relation to the total mass of the product. It has also been found in accordance with the invention that the relative extent to which the proportion of contaminations by alkali and alkaline earth salts can be reduced in a magnesia-based refractory ceramic product decreases if the proportion of contaminations by these salts in the product is very low. In this regard, it can be provided that only refractory ceramic products in which alkali and alkaline earth salts are present in the product in a minimum amount are treated by the method according to the invention. It can be provided in accordance with the invention that alkali and alkaline earth salts are present in the refractory ceramic product in an amount of at least 1 mass %, in relation to the total mass of the refractory ceramic product, that is to say for example also in an amount of at least 2, 3 or 4 mass %.

The water-based liquid provided for the execution of the method according to the invention can be, in principle, any water-based liquid, but preferably pure water. The particular advantage of the use of water as liquid lies in particular also in the fact that it can be provided particularly easily, economically, and in an environmentally friendly manner. A further advantage of the use of water as liquid also lies in particular in the fact that when executing the method according to the invention with use of water as liquid, no particular safety measures have to be taken in respect of the individuals tasked with executing the method according to the invention.

It has been found in accordance with the invention that when executing the method according to the invention, alkali and alkaline earth salts are removed very effectively and comprehensively from refractory ceramic products contaminated with such salts if these products are combined with a liquid in the form of water. Here, these salts dissolve in the water and are then removed from the refractory ceramic product. The liquid, that is to say in particular water, with the salt dissolved therein must then be treated or disposed of in an environmentally friendly manner following the execution of the method according to the invention. For cost reasons, it can be advantageous in this regard if, when executing the method according to the invention, only small amounts of liquid or water with alkali and alkaline earth salts dissolved therein are produced.

It has been found in accordance with the invention that, from a minimum ratio of mass of liquid to mass of refractory ceramic product, the dissolution of the salts from the refractory ceramic product practically ceases to rise significantly. In this regard it can be provided in accordance with the invention that the ratio of mass of liquid to mass of refractory ceramic product is set to this minimum ratio when executing the method according to the invention, so that, with an effective dissolution of the salts from the refractory ceramic product, only a minimal amount of liquid contaminated with the salts is produced at the same time. This minimum ratio of mass of liquid to mass of refractory ceramic product can lie in particular in the range from 0.5 to 10, in particular depending on the composition and grain size of the refractory ceramic products. It can therefore be provided in accordance with the invention that refractory ceramic product and liquid are combined in a ratio of mass of liquid to mass of refractory ceramic product in a range from 0.5 to 10, that is to say for example also in such a mass ratio of at least 1 or for example also in such a mass ratio of at least 9, 8, 7, 6, 5, 4 or 3.

Once the refractory ceramic product and the liquid have been combined in accordance with the invention, they are left combined for a period of time. Here, it has been found in accordance with the invention that if the product and liquid are left combined for an excessively long period of time there can be a minor hydration of magnesia contents of the refractory ceramic product. On the other hand, if the product and liquid are left combined for an excessively short period of time, alkali and alkaline earth salts might not dissolve to the desired extent from the refractory ceramic product. In this regard it can preferably be provided that refractory ceramic product and liquid, after having been combined, remain combined for a period of time of at most 60 minutes, that is to say for example also for a period of time of at most 50, 40, 30, 20 or 10 minutes. It can also be provided that the refractory ceramic product and the liquid remain combined for a period of time of at least 5 minutes, that is to say for example also for a period of time of at least 6, 7, 8, 9 or 10 minutes.

In accordance with one embodiment, it is provided that the refractory ceramic product and the liquid are mixed after having been combined. This mixing can be performed for the entire duration or only part of the duration of the combined state.

The refractory ceramic product and the liquid can be combined in a container, for example in a vat or in a drum. By way of example, the refractory ceramic product and the water can be combined in a mixing drum, so that they can be mixed there at the same time.

In order to separate the refractory ceramic product and the liquid, the refractory ceramic product by way of example can be removed from the water, for example via a sieve, a grate, or the like. Alternatively, the water by way of example can be drained from a container in which the refractory ceramic product and the liquid were combined. In order to accelerate the separation of the liquid from the refractory ceramic product, it can be provided that the refractory ceramic product is dried, for example in a drying apparatus, for example in a drying kiln.

The refractory ceramic products separated from the liquid, i.e. the dried refractory ceramic products, can then be made available as raw material for the production of refractory ceramic products. In particular, such products are refractory ceramic products for lining rotary kilns, in particular for lining cement rotary kilns.

It has surprisingly been found that a refractory ceramic product treated by the method according to the invention constitutes an excellent raw material for the production of such refractory ceramic products. This is because, after treatment of such a product by the method according to the invention, the refractory ceramic product still comprises contaminations in the form of alkali or alkaline earth salts only in concentrations that are so low that a refractory ceramic product contaminated by such small amounts of salts does not negatively impair the properties of a refractory ceramic product produced therefrom, or negatively impairs such properties only insignificantly.

In addition, it has surprisingly been found that the refractory properties of a refractory ceramic product produced with use of a refractory ceramic product treated by the method according to the invention can even be improved in part. By way of example, the thermal conductivity of a magnesia-based refractory ceramic product produced with use of refractory ceramic product treated by the method according to the invention can be reduced. The inventors propose that this can be attributed to the fact that a refractory ceramic product treated by the method according to the invention generally has a lower raw density and a higher open porosity compared to a newly extracted, i.e. unused and un-recycled, magnesia-based raw material. Further refractory properties of the refractory ceramic products, for example their cold compressive strength and hot strength, remain uninfluenced, or are only insignificantly influenced, by contents of the refractory ceramic product treated by the method according to the invention.

Against this background, the method according to the invention can also comprise the further method step in which the refractory ceramic product separated from the liquid and at least one further magnesia-based refractory ceramic raw material are combined and then further processed jointly to provide a refractory ceramic product. A refractory ceramic product of this kind, as previously mentioned, can be for example in particular a refractory brick for lining cement rotary kilns. The further processing of combined refractory ceramic product and magnesia-based refractory ceramic raw material can be performed in accordance with the techniques known from the prior art for production of refractory ceramic products, that is to say for example by mixing the refractory ceramic product with the refractory ceramic raw material, the subsequent compaction to form a shaped, unburnt ceramic product (a green body), any subsequent drying of the green body, and lastly a burning of the green body, in which the green body is sintered to provide a refractory ceramic product.

In this respect, the invention also relates to the use of the refractory ceramic product separated from the liquid in accordance with the method according to the invention as raw material for the production of a refractory ceramic product.

Insofar as the refractory ceramic product treated by the method according to the invention is used as raw material for the production of a refractory ceramic product and is further processed with at least one magnesia-based raw material to provide a refractory ceramic product, this at least one refractory ceramic raw material can be, in principle, any magnesia-based raw material, but not a recycled magnesia-based raw material. In particular, the at least one refractory ceramic raw material can be a freshly obtained raw material, that is to say not a recycled raw material, in the form of at least one of the following raw materials: sintered magnesia, fused magnesia, or magnesia spinel.

It has been found in accordance with the invention that, by means of the treatment of a refractory ceramic product by means of the method according to the invention, the porosity of said product can increase slightly or the raw density thereof can reduce. Furthermore, a refractory ceramic product treated by the method according to the invention can still comprise alkali and/or alkaline earth salts.

Further features of the invention will become clear from the claims and the following practical example of the invention.

All of the features of the invention disclosed herein can be combined arbitrarily with one another, individually or in combination.

A practical example of the invention will be explained in greater detail hereinafter.

The practical example relates to a method according to the invention for treating a refractory ceramic product in the form of a used refractory lining of a cement rotary kiln.

In a first method step the refractory lining of a cement rotary kiln which comprised magnesia and a number of alkali salts was removed from the rotary kiln. The refractory lining was formed of magnesia-based refractory ceramic bricks comprising further amounts of hercynite and magnesia spinel. These bricks contaminated by the alkali salts had the following composition, in each case in mass % and in relation to the total mass of the bricks:

MgO: 78.01 mass %
$Al_2O_3$: 6.56 mass %
$Fe_2O_3$: 0.78 mass %
alkali salts ($Na_2SO_4$, NaCl, $K_2SO_4$ and KCl): 7.85 mass %
other: 6.80 mass %.

The removed material present in the form of large lumps following removal from the rotary kiln was crushed by a crusher to a desired grain size. In so doing, the removed material was crushed and processed in such a way that it was then present to an extent of 100 mass % with a mean grain size in the range from 0.5 to 10 mm.

The accordingly processed removed material or refractory ceramic product was then combined in a mixing drum with a liquid in the form of water. The mass ratio of water to refractory ceramic product was approximately 1.5. The refractory ceramic product and the water were then left combined in the mixing drum for a period of approximately 10 minutes. During this period, the refractory ceramic product and the water were thoroughly mixed with one another by rotation of the mixing drum. During this period, significant amounts of the alkali salts of the refractory ceramic product dissolved in the water, so that the content of the alkali salts and the refractory ceramic product could be reduced from initially 7.85 mass %, in relation to the total mass of the refractory ceramic product, to approximately 2.70 mass %, and therefore on the whole by approximately 66%.

In a next method step the refractory ceramic product and the water were separated from one another. For this purpose, the water with the alkali salts dissolved therein was firstly removed from the mixing drum and fed to an environmentally friendly disposal system. The refractory ceramic product was also fully dried in a drying apparatus.

The resultant refractory ceramic product treated by the method according to the invention was used as raw material for the production of refractory ceramic products in the form of bricks for lining cement rotary kilns. For this purpose, the treated, recycled refractory ceramic product was combined with further raw materials in the form of sintered magnesia and magnesia spinel, compacted, and sintered to provide refractory ceramic bricks.

Refractory ceramic products denoted by A to H are specified in Table I below. The proportions of the components of the batches from which the products A to H were produced are provided in the upper part of Table I in mass %, more specifically in each case in relation to the total mass of the batch. Physical properties of the products A to H are specified in the lower parts of the Table I.

The used sintered magnesia had a proportion of MgO, in relation to the sintered magnesia, of 96.0 mass %.

"CRK treated removed material" denotes the refractory lining of a cement rotary kiln treated in accordance with the invention according to the above practical example. "CRK untreated removed material" denotes the refractory lining of a cement rotary kiln forming the basis of the above practical example, but not treated in accordance with the invention.

The physical properties were determined in accordance with the following standards: raw density and open porosity according to DIN EN 993-1:1995-04 cold compressive strength according to DIN EN 993-5: 1998-12 hot strength according to DIN EN ISO 1893:2008-09

TABLE I

| Component | A | B | C | D | E | F | G | H |
|---|---|---|---|---|---|---|---|---|
| sintered magnesia >0.1-5 mm | 55 | 30 | | 30 | 30 | 30 | 30 | 30 |
| sintered magnesia >0-0.1 mm | 29 | 29 | 29 | 29 | 29 | 29 | 29 | 29 |
| MA spinel (magnesia aluminate spinel) | 16 | 11 | 11 | 11 | 11 | 11 | 11 | 11 |
| CRK treated removed material 0.1-5 mm | | 30 | 60 | | 30 | | 30 | |
| CRK untreated removed material 0.1-5 mm | | | | 30 | | 30 | | 30 |
| raw density [g/cm$^3$] | 2.96 | 2.94 | 2.87 | 2.91 | 2.91 | 2.89 | 2.94 | 2.91 |
| open porosity [vol. %] | 16.1 | 16.3 | 18.4 | 17.0 | 17.4 | 17.8 | 16.9 | 17.7 |
| cold compressive strength [MPa] | 65 | 59 | 44 | 46 | 59 | 49 | 55 | 48 |
| hot strength $t_0$ [° C.] | 1464 | 1441 | 1460 | 1338 | 1444 | 1267 | 1424 | 1410 |
| hot strength $t_{0.5}$ [° C.] | 1697 | 1679 | 1662 | 1605 | 1696 | 1569 | 1642 | 1648 |

Product A is a conventional refractory ceramic product based on the raw materials sintered magnesia and MA spinel.

In products B to H some of the sintered magnesia and the MA spinel was replaced by a raw material in the form of a used refractory lining of a cement rotary kiln, more specifically in products B, C, E and G by the raw material "CRK treated removed material" and in products D, F and H by the raw material "CRK untreated removed material". Since the raw materials "CRK treated removed material" and "CRK untreated removed material" contained amounts of Al$_2$O$_3$, the amount of oxides MgO and Al$_2$O$_3$ in all products A to H was approximately the same.

It can be clearly seen in Table I that the values of the cold compressive strength and hot strength of the products B, C, E and G correspond approximately to the values of product A, whereas these values are significantly lower in products D, F and H.

Furthermore, in products B, C, E and G, the values for the raw density are below, and the values for porosity are above the corresponding values of product A. This results in a low thermal conductivity of products B, C, E and G compared to product A, and therefore products B, C, E and G have a good thermal insulation capability.

At the same time, products B, C, E and G can be provided more economically than product A, since significant amounts of economical, recycled raw material in the form of a used refractory lining of a cement rotary kiln can be used for the production of products B, C, E and G.

The invention claimed is:

1. A method for treating refractory ceramic products, said method having the following features:
   providing a refractory ceramic product in the form of a used refractory ceramic lining of a rotary kiln for burning cement clinker, comprising:
   magnesia and
   at least one of the following salts: one or more alkali salts and one or more alkaline earth salts, in which the refractory ceramic product comprises a content of alkali or alkaline earth salts of at least 1 mass %, in relation to the total mass of the refractory ceramic product;
   providing a water-based liquid;
   combining the refractory ceramic product with the liquid, wherein combining the refractory ceramic product with the liquid results in some of the one or more of the alkali salts and the one or more alkaline earth salts dissolving in the liquid such that the mass % of the alkali or the alkaline earth salts in the refractory ceramic product is reduced; and
   subsequent to combining the refractory ceramic product with the liquid, separating the refractory ceramic product and the liquid.

2. The method according to claim 1, further comprising:
   prior to providing the refractory ceramic product, removing the refractory ceramic lining of a rotary kiln for burning cement clinker, said lining comprising magnesia and at least one of the following salts: one or more alkali salts and one or more alkaline earth salts.

3. The method according to claim 2, further comprising:
   subsequent to removing the refractory ceramic lining of the rotary kiln for burning cement clinker and prior to providing the refractory ceramic product, comminuting the removed lining.

4. The method according to claim 3, in which the lining is comminuted to a grain size of at least one of:
   less than 50 mm; or
   more than 0.1 mm.

5. The method according to claim 1, in which the refractory ceramic product is provided in the form of bulk material.

6. The method according to claim 1, wherein the refractory ceramic product is present to an extent of at least 90 mass %, in relation to the mass of the refractory ceramic product, with a grain size of less than 50 mm.

7. The method according to claim 1, wherein the refractory ceramic product is present to an extent of at least 90 mass %, in relation to the mass of the refractory ceramic products, with a grain size of more than 0.1 mm.

8. The method according to claim 1, in which the refractory ceramic product comprises a content of magnesia of at least 60 mass %, in relation to the total mass of the refractory ceramic product.

9. The method according to claim 1, in which water is provided as the liquid.

10. The method according to claim 1, further comprising:
combining the refractory ceramic product separated from the liquid with at least one further magnesia-based refractory ceramic raw material;
further processing the combined refractory ceramic product and the at least one further refractory ceramic raw material to provide a refractory ceramic product.

* * * * *